(12) United States Patent
Mays

(10) Patent No.: US 6,351,710 B1
(45) Date of Patent: Feb. 26, 2002

(54) METHOD AND SYSTEM FOR VISUAL ADDRESSING

(76) Inventor: Michael F. Mays, 1378 George Walton's Rd., Mount Solon, VA (US) 22843

( * ) Notice: Subject to any disclaimer, the term of this patent is extended or adjusted under 35 U.S.C. 154(b) by 0 days.

(21) Appl. No.: 09/671,271

(22) Filed: Sep. 28, 2000

(51) Int. Cl.[7] .............................................. G01C 21/26
(52) U.S. Cl. ....................... 701/211; 701/200; 701/201; 340/995; 342/357.13
(58) Field of Search ................................. 701/200, 201, 701/206, 202, 211; 340/995; 342/357.13

(56) References Cited

U.S. PATENT DOCUMENTS 6,199,014 B1 * 3/2001 Walker et al. .............. 701/211

* cited by examiner

Primary Examiner—William A. Cuchlinski, Jr.
Assistant Examiner—Arthur D. Donnelly
(74) Attorney, Agent, or Firm—James F. Cottone

(57) ABSTRACT

A method and system for visual addressing provides highly intuitive means for guiding travelers between predetermined starting points and destinations using largely photographic techniques. In a baseline point-to-point embodiment, photographs are produced of way points determined to provide preferred and alternate routes to guide a traveler, and are provided in pictograph form. In an advanced regional embodiment, a large number of photographs are produced of way points sufficient in number and location to enable the determining of routes within a bounded region between any one of a plurality of starting points and any one of a plurality of destinations. A traveler or end user needing travel guidance may access either hard copy photographs in pictograph form or a city booklet form, or alternately access fully equivalent information in digital form which may be delivered via digital networks for reconstitution into pictographs or city booklets.

16 Claims, 7 Drawing Sheets

METHOD AND SYSTEM FOR VISUAL ADDRESSING

TECHNICAL FIELD

The present invention relates generally to an entirely visual technique for guiding travelers based on using photographs to provide the guidance, and more particularly to methods and a system for obtaining, processing, distributing and using photographs of way points selected along preferred routes to guide a motorist from one or more predetermined starting points to one or more predetermined destinations.

BACKGROUND

Motorists have been grappling with the problems of traveling along unfamiliar roads and highways for as long as vehicles and roadways have been in use. Answers to the well known and frustrating questions—where are we? did I drive past my turn off? which way do I go at the next intersection?, plus a host of others—are increasingly difficult to get as new roads multiply and traffic gets progressively heavier. Enormous amounts of time, money and human energy have been expended worldwide for a wide range of efforts directed to addressing the many facets of guiding motorists. In recent years these efforts have been moving in the direction of increasingly complex electronic systems to meet the needs of giving timely and accurate guidance to travelers.

Descriptions of typical prior art devices and systems for providing real time guidance to travelers are found in a number of U.S. patents.

U.S. Pat. No. 5,115,398 to DeJong discloses displaying navigation data for a motor vehicle which uses a real time image of the local environment (taken by a camera mounted on the vehicle) onto which is superimposed arrows indicating the direction for a motorist to follow.

U.S. Pat. No. 6,018,697 to Morimoto et al. provides a teaching of superimposing turn information on traffic-related, computer generated images to provide characteristic features of an intersection.

Three U.S. patents assigned to the AISIN AW Co., Ltd disclose the use of photographs as part of complex vehicle navigation systems. These are U.S. Pat. Nos. 6,067,502 and 6,035,257, both to Hayashi et al., and U.S. Pat No. 4,937,752 to Namba et al. Each of these discuss "successively displaying photographs showing intersections" but all 'photographs' are computer retrieved from storage and are presented on a display device (CRT-like) mounted in the vehicle.

Despite the generous amount of innovation exhibited in these prior art approaches, there has not been widespread acceptance or public usage of the proposed systems. There are many reasons why the traveling public has not been attracted to them. First, due to their complexity and the high degree of expertise needed to set up and operate them, they do not appeal to the average motorist. Then, the costs and difficulty of retrofitting their complex components into a typical car are not considered cost effective due to their comparatively infrequent need. Perhaps the most important reason for their low acceptance rate of complex systems, however precise they are, is just that—their complexity. As travel guidance systems become more complex, possibly because of the increasing precision they offer, they become increasingly less intuitive to use. That is, the user must learn and carry in his/her head a complex set of system rules, may be required to manipulate many controls in proper sequences, and needs to mentally correlate electronically formatted outputs with the actual roads and highways whizzing past. It is precisely this set of needs—low cost, simplicity, highly intuitive—that the present visual addressing system admirably meets. Thus, a long felt need for a simple, low cost, easy to learn and use, entirely visual approach to guiding travelers is satisfied by the present invention.

OBJECTS OF THE INVENTION

It is therefore a primary object of the present invention to provide improved methods and apparatus for guiding travelers between specified starting points and destinations which overcome the disadvantages of the prior art approaches.

A further object of the present invention is to provide a method of guiding a motorist using a sequence of photographs to provide a simple, highly intuitive and entirely visual means of travel guidance.

A still further object of the present invention is to provide a system for obtaining, processing, distributing and using a plurality of photographs, and associated textual and graphic directions, to assist in guiding a traveler between predetermined starting points and destinations.

A yet further object of the present invention is to provide an entirely visual method of guiding a motorist using a plurality of sequentially arranged way point photographs in hard copy form to guide an end user along a preferred route between one or more predetermined starting points and one or more predetermined destinations.

In a baseline method for providing point-to-point visual guidance to a traveler, motorist, or end user, a series of way point photographs are compiled into a pictograph such that the physical arrangement of the individual photographs provide the desired guidance. The arrangement provides way points in natural driving order for ease of use. The pictographs may be hard copies provided as a single sheet, a fold-up brochure, or in booklet form regenerated from downloaded digital data. The photographs are produced by physically traversing the routes between predetermined starting points and desired destinations and capturing scenes of selected way points using a variety of scene capturing devices. These photographs are then annotated, processed, stored and subsequently retrieved as needed for delivery to an end user. In an advanced regional method for providing guidance between a plurality of starting points and a plurality of destinations—all within the boundaries of the region—a large number of way point photographs are taken and compiled into a 'city booklet.' Thereafter, responsive to specific end user requests detailing one or more starting points and one or more destinations, routes are selected by joining paths of way points based on their locations to produce either a pictograph or a route listing. In either the point-to-point or regional approach, the end user is guided by visually correlating the photographs of actual way points with superimposed directional arrows and descriptive text with the road actually being traveled as seen through their windshield.

BRIEF DESCRIPTION OF THE DRAWINGS

Additional objects and advantages of the invention will become apparent to those skilled in the art as the description proceeds with reference to the accompanying drawings, wherein.

BEST MODE FOR CARRYING OUT THE INVENTION

Figure 1:
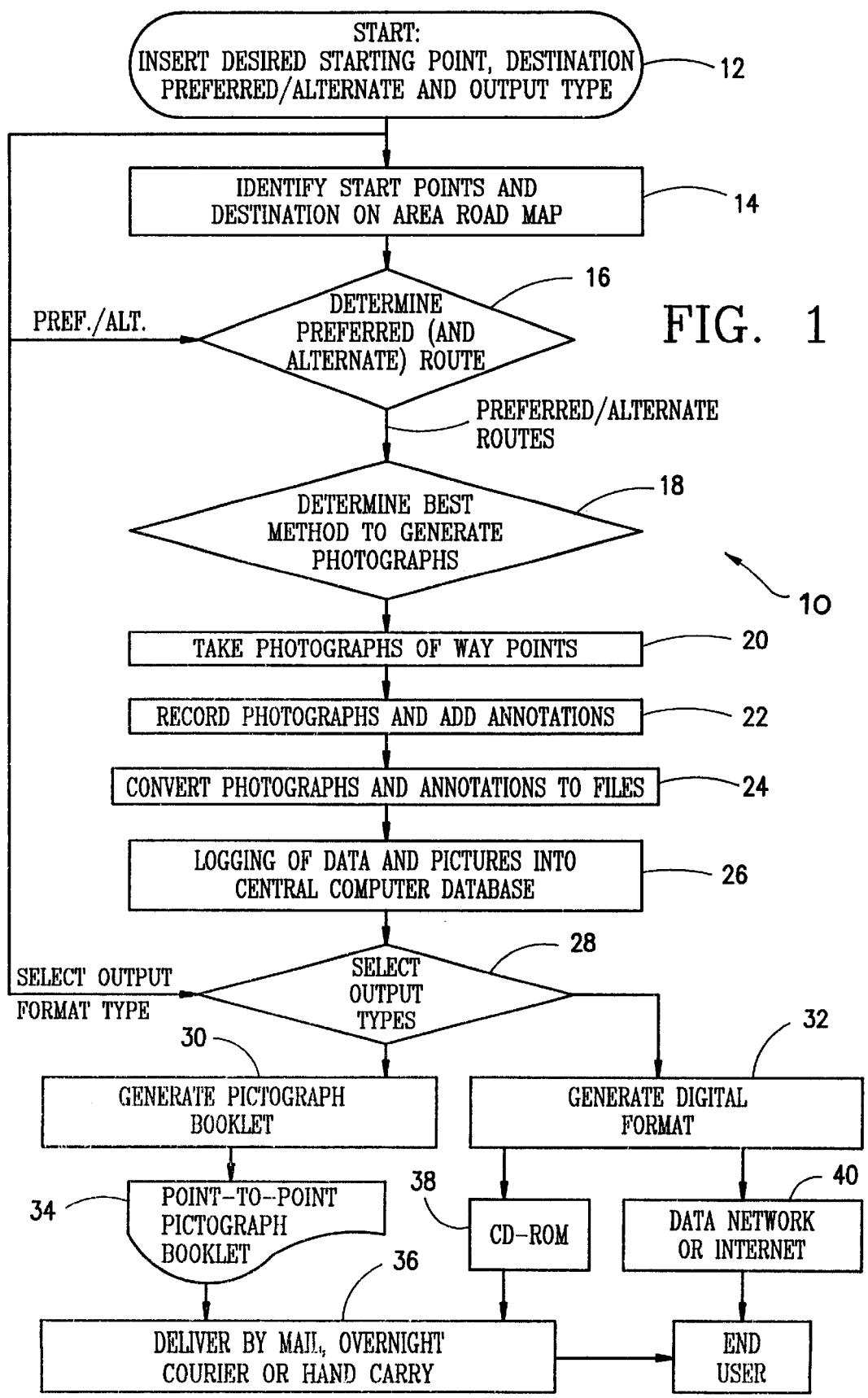
FIG. 1 is a flow chart detailing a baseline point-to-point embodiment of a visual addressing method according to the present invention.

Referring now to FIG. 1, there is shown a simplified flow chart outlining a baseline visual addressing method according to the present invention. The baseline method 10 details the steps to implement a point-to-point embodiment used for guiding an end user from a single predetermined starting point to a single desired destination point. Block 12 depicts the largely manual step of obtaining and entering the predetermined starting point, the desired destination, calling for a preferred or alternate route between them, and further designating the particular type of output desired. In block 14 the two input points are located on a road map of suitable scale, and a preferred or alternate route between the two is determined in block 16 for eventual presentation to an end user. A preferred route is typically determined by a priori knowledge of local road conditions, and other factors such as road construction, traffic flow, temporary hazards, and the like. Identifying or selection of alternate routes may also be accomplished at block 16 for possible future use. Depending on the particular implementation employed, these method steps may be accomplished manually, via automated means, or more commonly using a combination of manual and automated means.

At block 18 the largely manual step of determining the best method for generating photographs of the way points is accomplished. This includes selection of one or more photograph-capturing devices in accordance with the nature of the roads, traffic conditions, time of year, and the like. As used herein, way points may include starting points, destinations, main and/or secondary intersections, en route landmarks, turn locations and other end user useful locations for which a photograph is called for. Standard photographic cameras, camcorders, digital cameras, plus variants of these and other devices are contemplated for use, with the 35 mm camera generally considered as the baseline photograph capturing means. At block 20 the actual photograph taking steps are accomplished by physically traversing the preferred (and/or alternate) route(s) and capturing the images associated with the way point locations previously determined. On completion of the photographing, way point images are recorded and annotated in block 22. These annotations may include a range of information types to be used for end user purposes, for cataloging and for administrative requirements. Textual and graphic annotations are added which will appear along with a particular photograph to provide standardized written directions and visual direction symbols to the end user. Cataloging annotations may include assigning way point physical location addressing, internal accession address codes, as well as date and time of capturing the photographs. Administrative annotations may include information on what type of image capturing device produced the photograph as well as copyright notification, and the like. The results of this combining—images, directional information, text, addressing, etc.—are converted in block 24 into computer readable files and are stored for subsequent retrieval in a main computer database at block 26. The output of block 28 is conditioned by a control input from block 12 to select the desired type of output format to be generated by blocks 30 and 32. Block 30 generates a pictograph booklet 34 which may then be delivered to an end user by mail, overnight courier, or other type of physical delivery means 36. Block 32 generates essentially the same content as in a pictograph, but in digital form for producing a CD-ROM 38 for physical delivery, or for outputting to an end user via various digital data networks 40 including an internet port.

Figure 2:
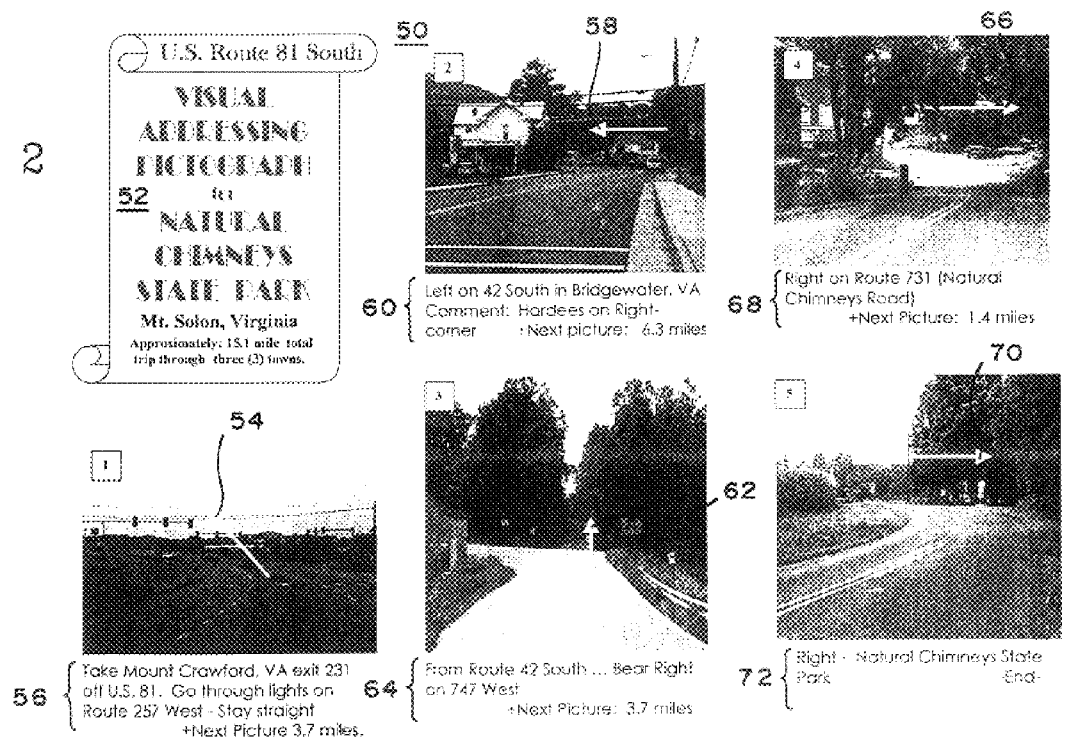
FIG. 2 is a pictograph produced via the method of FIG. 1 showing photographs of five way points directing an end user from a particular starting point to his/her desired destination.

A typical point-to-point pictograph is shown in FIG. 2 as five photographs arranged in a sequence to guide an end user along a preferred route. A pictograph 50 is provided as a hard copy sheet, brochure or folder providing visual addressing to, illustratively, the destination of National Chimneys State Park in Virginia, as indicated in a legend area 52, and includes annotated photographs numbered [1] through [5]. In photograph [1] we see the actual road scene that the driver/end user would encounter upon exiting interstate highway US 81 south at exit 231, his/her starting point. A superimposed arrow 54 indicates the path to be taken along the road shown, and the annotations in area 56 provide additional textual detail and guidance for the driver. Thereafter, photographs [2], [3] and [4] provide photographs of three additional way points in proper driving sequence or order, including directional arrows 58, 62 and 66 along with their corresponding textual annotation areas 60, 64 and 68. In the final photograph [5], the entrance to the desired destination is seen with a right turn directional arrow 70 denoting the path to the entrance, as described in the annotation area 72. As taught herein, arranging the way point photographs in driving order means that the photographs are physically arrayed, or may be numbered so as to be arrayed, in the same order as a driver properly following the route would naturally encounter the way point locations that the photographs represent.

Thus there has been described the baseline point-to-point visual addressing method of the present invention, which presents en route travel information in a highly intuitive manner such that it is immediately useable by a driver or end user without the need to learn or manipulate complex or confusing systems or devices. In a nutshell, a number of actual photographs are produced and arranged in a natural or driving order sequence in hard copy form to guide a driver along a preferred route from a single predetermined starting point to a desired destination. Ideally, each way point photograph is taken and presented from a driver's eye view; at a designated distance and exposure so that the driver or end user can get familiar with the distance perception portrayed. Clear and simple direction arrows and text using standardized wordings annotate and complete each photograph. A digital version of the pictograph may also be produced and stored in a hard medium or outputted via a digital network.

As used herein, the meaning of the term pictograph is accordingly expanded from its narrow dictionary definition to encompass a compilation of visual images in tangible form (ie, hard copy), arranged in a particular sequence or manner so as to visually assist an end user in accomplishing a desired task. The images may include annotations such as graphics, text and addressing. In terms of the present invention, the task is that of aiding in the driving of a vehicle from a starting point to a desired destination unerringly, without the driver or other occupant having previously traveled the route. Note that the point-to-point method is not necessarily limited to just short trips or highly localized areas. It is contemplated that a dozen or two carefully selected way points may be adequate to guide a motorist from the western end of the George Washington Bridge in New York City, down the New Jersey Turnpike to a destination in Baltimore just off I-695, the Baltimore Beltway.

Figure 3:
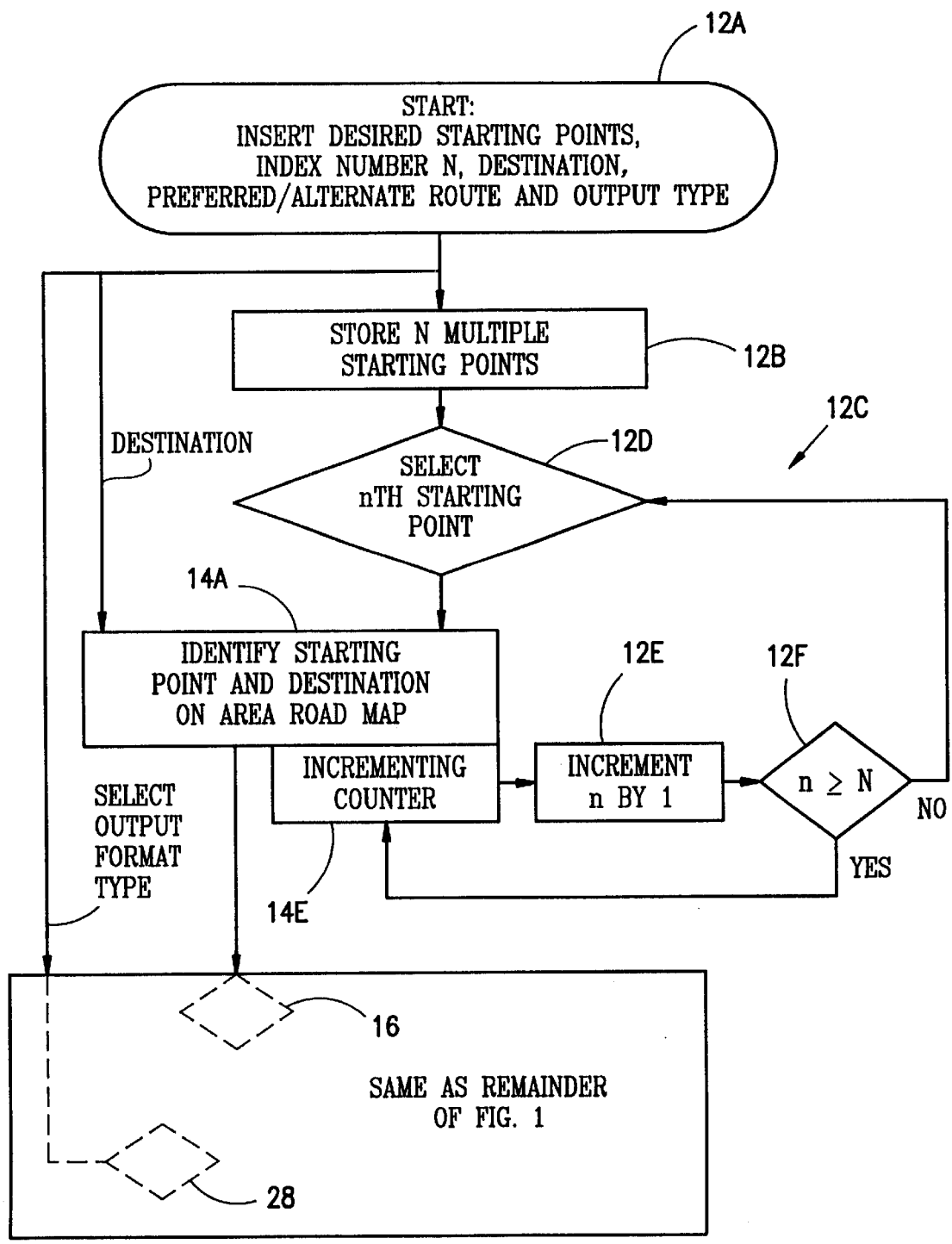
FIG. 3 is a partial flow chart showing an alternate embodiment of the point-to-point visual addressing method of FIG. 1 whereby a number of different starting points are accommodated.

The above baseline embodiment is readily amenable to being of even greater usefulness in expanded embodiments. Consider first the commonly encountered need to guide a traveler to a given destination where the traveler may be approaching from any one of several different directions, which gives rise to the need for a multiple starting point capability. FIG. 3 shows a modification to the method of FIG. 1 to accomplish this. Whereas the pictograph of FIG. 2 shows a single starting point, single destination brochure, it would be more generally useful to provide a plurality of pictographs, each of which is devoted to a different starting point. These may include approaching the single destination from the north, south, east or west, as well as approaching from more than one interstate highway, or from other well known roadways or intersections.

In the partial flow chart of FIG. 3, block 12A includes the additional capability of accepting multiple starting points and an index number N denoting how many of them are inputted. The N starting points are stored in block 12B for sequential use under the control of a counting loop 12C. On retrieval of the first (n=1) of N starting points by selection block 12D, the method proceeds substantially as described in connection with the FIG. 1 embodiment to produce a pictograph in the desired output type for the particular starting point selected. On completion of processing the first starting point in block 14A and thereafter, block 14A then increments counter 14E by one count causing the blocks 12E and 12F to select the next (n=2) starting point to be fully processed to produce another distinct pictograph. When the full N starting points have been processed, block 12F cuts off the incrementing counter 14E and the system becomes quiescent waiting for a new set of data to be loaded at block 12A. The N distinct pictographs thus produced may be provided as stand alone hard copies, or they may be combined into one or more booklets or brochures. The digital output type, if selected, is similarly handled. Note that the blocks functionally below the modification of FIG. 3, namely blocks 16 and 28 and thereafter, operate identically as previously described.

Figure 4:
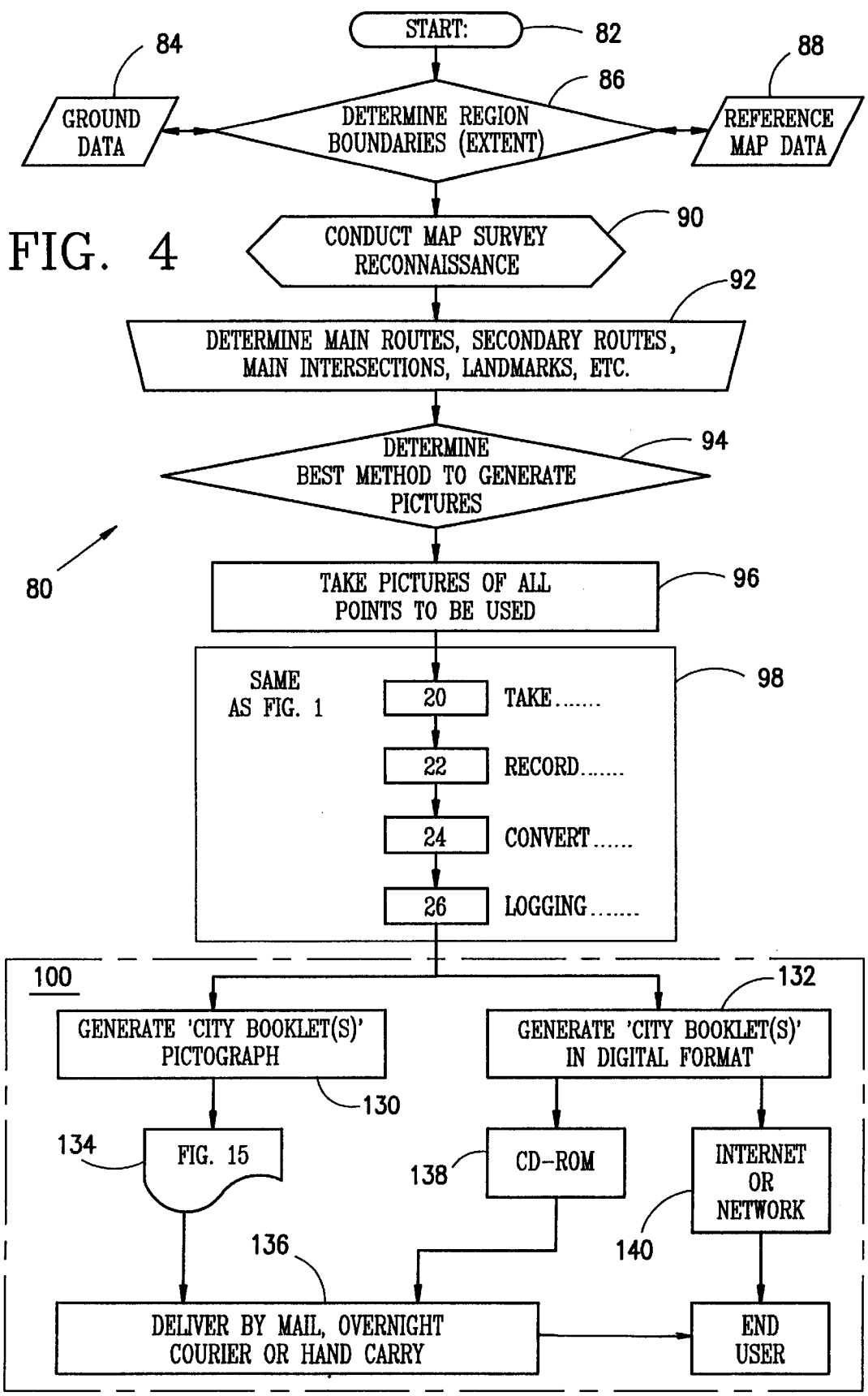
FIG. 4 is a flow chart detailing an advanced regional embodiment of a visual addressing method according to the present invention.

An advanced regional embodiment of a visual addressing method employing the techniques taught herein is detailed in the flow chart of FIG. 4. Whereas the previous point-to-point embodiments are concerned with guiding an end user from a particular one or more starting point(s) to a single destination, the regional visual addressing method allows for a much more generalized approach. Briefly, the regional method is carried out by compiling a large number of way points in a given region so as to facilitate guiding an end user from any one of many, or virtually any, starting point(s) within the region to any one of many, or virtually any, destination(s) within that region. The region may be as large as a major city, may encompass a college campus or hospital complex, or may be as small as a local shopping mall. All that is required is the inclusion of a sufficient number of way point photographs to permit the eventual assembly of a pictograph having enough detail to enable an end user to get from a selected starting point to a desired destination.

This regional embodiment is best described first in terms of how to produce a collection of photographs to be assembled into a 'city booklet' either in hard copy or in digital form as shown in FIG. 4, and second how an end user can use the city booklet. With concurrent reference now to FIGS. 4, 5 and 6 (and occasional brief reference to FIGS. 1–3), note that FIG. 4 describes a method 80 of implementing the regional embodiment, FIG. 5 is an illustrative city booklet 200 produced by the method of FIG. 4, and that FIG. 6 describes a method 250 of using the regional city booklet.

In blocks 82 and 86 of FIG. 4, the boundaries of the region to be covered are determined and entered. As before, many of the steps may be accomplished by manual means, by automated means, or more commonly, by using combinations of the two. The boundaries are conformed using publicly available ground data of block 84 and reference map data of block 88. In blocks 90 and 92 the largely manual steps of conducting a map survey of the coverage region and determining the main roads and intersections, and so forth, are accomplished. Based on the results of the processes of blocks 90 and 92, a number of way points needed to define a number of routes through the city are identified. Thereafter, having this suitable number and locations of way points in hand at block 94 the best method of generating photographs at each way point is accomplished, as previously described. Blocks 94, 96 and 98 then process the photographs, as previously described. (Note that block 98 includes virtually the same steps as blocks 20, 22, 24 and 26 of FIG. 1.) An output section 100 functions identically to that of blocks 28 through 40 of FIG. 1, the primary difference being the control of the output pictograph or its digital equivalent and the providing of both hard copy pictographs via block 130 and its digital equivalent via block 132. Note the absence of a specific block which selects output type. The purpose of providing both output types is given hereinbelow in the method of use portion of the description.

Figure 5:
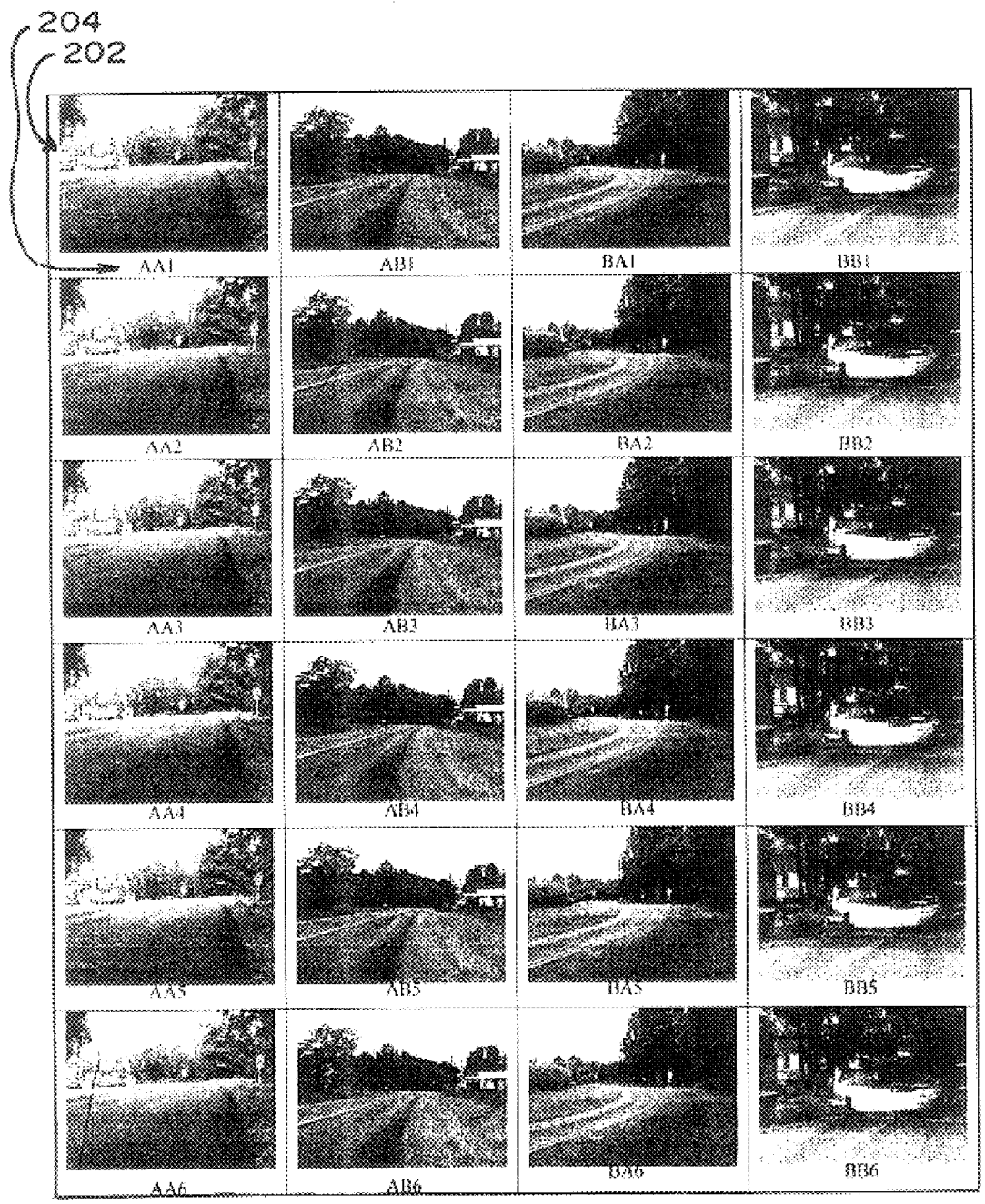
FIG. 5 is a 'city booklet' pictograph produced via the method of FIG. 4, showing a large number of individual way point photographs assembled into an addressable array.

FIG. 5 shows a typical city booklet 200 as an array of 24 photographs arranged in addressable order. An illustrative photograph 202 shows a single way point which may be called up with reference to its internal address AA1, as shown in an address area 204. As used herein, 'city booklet' describes a compilation of a plurality of photographs where the photographs are arranged in an addressable array (in hard copy or digital form) for subsequent use in creating a point-to-point pictograph or for use with a route listing. In many ways a city booklet is much the same as a pictograph, but it lacks the physical sequence or natural driving order needed to guide an end user, and it includes a number of inapplicable photographs for any one preferred route. Also, the term city booklet is used in a generic sense to denote regional visual addressing and may include an entire city, only a downtown district, or may be as circumscribed as a large shopping mall, a university or medical campus.

The city booklet 200 is shown, illustratively, as a single sheet containing 24 photographs. However, larger regions covered by the present method and system may contain significantly more photographs displayed on a number of pages, which may be bound into a booklet, or may be left free standing. It is estimated that a relatively small city such as Leesburg, Va. might require as many as several hundred (200–700) photographs to provide reasonably fine grained guidance to a first time traveler to get to and from its key locations—such as it's county courthouse, municipal office buildings, shopping malls and outlets, equestrian center, and the like. All of these via it's two main access highways of Routes 7 and 15, as approached from any of the four compass points.

Figure 6:
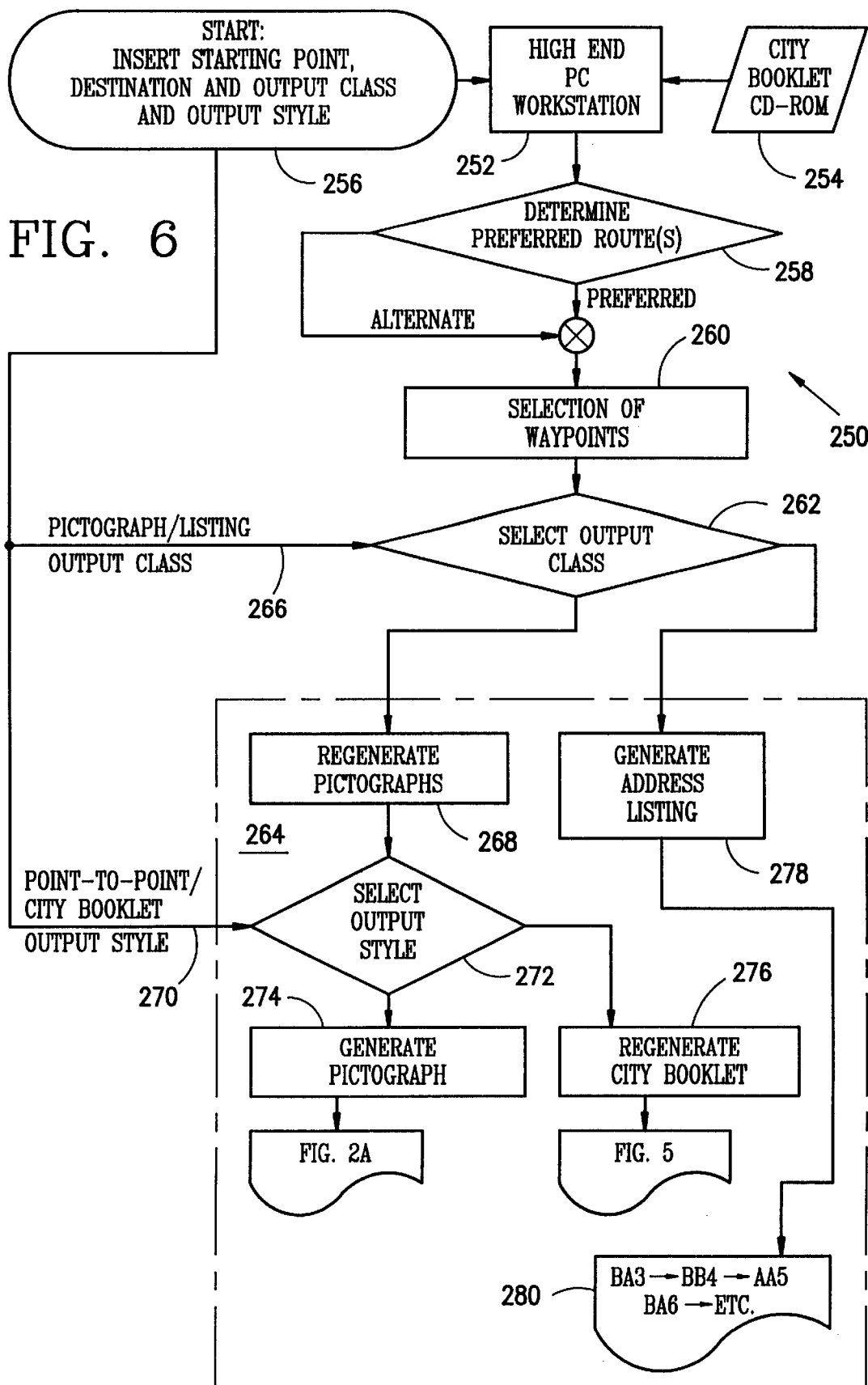
FIG. 6 is a flow chart outlining how to use the regional embodiment visual addressing method of FIG. 4 using the addressable array of photographs of FIG. 5 to generate various types of visual addressing outputs.

FIG. 6 is a flow chart detailing a preferred manner of using the an addressable array of photographs such as those in the city booklet 200. A workstation-based method 250 has as it's core a high end PC 252 into which has been loaded a CD-ROM 254 containing an appropriate city booklet in digital form, such as that produced in block 138 of FIG. 4. With real time programming in operation in PC 252, an operator, (or possibly an end user) inserts a predetermined starting point, a desired destination and designates what combination of output classes and styles is desired via a block 256. Three possible outputs are: a point-to-point pictograph similar to that of FIG. 2; a regional city booklet as shown in FIG. 5; or a route listing yet to be described. In block 258 a preferred route (and possibly an alternate) is determined by connecting a path derived by linking together a collection of way points based on their physical location addresses which were inserted during the annotation steps. The actual selection of way points is accomplished in block 260. Because the way point photographs already exist as digital files in CD-ROM 254, it is not necessary to generate them again but only to transfer them to hard copy output section 264 under the control of class selection block 262. In response to a designation of pictograph and/or listing signal via line 266 the user may first select a desired output class. If the pictograph output class is selected, the CD-ROM stored photographs regenerated in block 268 are then transferred to produce either a point-to-point pictograph as determined by the inserted starting point and destination, similar to that of FIG. 2—or alternately to regenerate a hard copy of the city booklet of FIG. 5. Which of these two hard copy output styles is produced is determined by the designation input via line 270 which routes the regenerated photographs via block 272 to blocks 274 and 276 which generate one of the hard copy output styles, shown as FIG. 2A or FIG. 5.

If the listing output class is selected, block 278 generates a listing of way point addresses produced in block 260 such that the sequence of the way points constitutes the preferred route in proper driving order. This output listing is printed out as sheet 280 and may then be used in combination with a preexisting copy of a corresponding city booklet, or with a newly regenerated copy of the city booklet via blocks 272 and 276. Thereafter, an end user armed with one of two styles of pictographs and/or an address listing can, as before, be unerringly guided to his/her desired destination.

Figure 7:
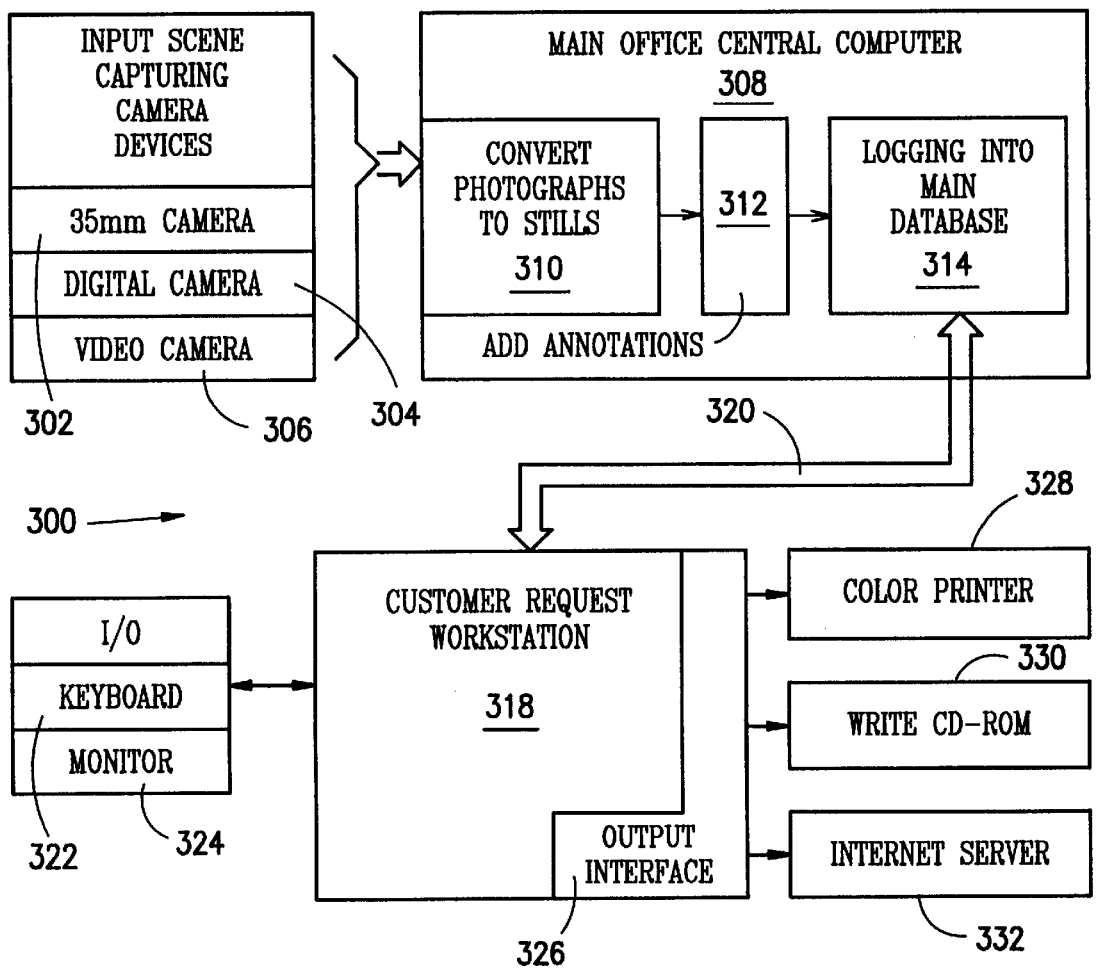
FIG. 7 is a simplified block diagram showing the apparatus by which the point-to-point methods of FIGS. 1–3 may be implemented.

Referring now to FIG. 7, illustrative apparatus via which the point-to-point embodiments of FIGS. 1–3 may be implemented is shown in simplified block diagram form. A point-to-point system 300 includes one or more input scene capturing devices, including a 35 mm camera 302, a digital camera 304 and a video camera 306. As previously detailed, the actual type of input device employed will be determined by actual scene capturing conditions encountered—traffic, weather, time of day, etc. along the route or at the way point being considered. The 35 mm camera is considered as the baseline input device, and photographs are generally taken by a windshield-mounted camera using 100, 200 or 400 speed film. As the rolls of film are exposed, they are be processed at a home office facility to verify quality, way point location, database entry and logging, then uploaded into the main office central computer in JPEG picture file format.

Digital camera 304, capable of using an internal disk or a 3&½ floppy disk (internal or external) and capable of being equipped with zoom/special light receiving capabilities, may also be used. In congested travel areas where additional vehicle safety is required, video camera 306 is indicated for use. Still frame pictures will be made at predetermined road sites, landmarks, and the like while traveling. Snappy™ software provides the desired conversion to compatible output types.

The bulk of the photograph processing, annotation, conversion, etc. is accomplished in a main office central computer 308. In the block 310 the 35 mm photographs are converted into JPEG files, digital camera photographs are uploaded and/or transposed video tapes are edited/converted to still frame photographs. In block 312, photograph annotations and other control inputs are added via a keyboard 322, and all data and photographs are assembled into a main database 314. In a preferred basic embodiment, the database 314 may be implemented using a minimum MicroSoft Windows® system requirement of 486, Pentium or Pentium Pro or higher; Windows® 3.1x with DOS 5.0 or later, Windows® 95 or Intel-based Windows NT® (version 3,5,1 or greater); 16 MB of RAM; 8-bit (256-color) or greater display adapter; and a 2x CR-ROM drive or faster).

Production of pictographs is accomplished using a high end personal computer customer request workstation 318 which communicates with the main database 314 via a bidirectional bus 320. The workstation 318 includes the usual I/O devices such as a keyboard 322, high resolution CRT monitor 324 and an output interface 326. Responsive to specialized programming running in the workstation 318, as well as operator commands via keyboard 322, any of three output means may be enabled. A photographic quality, high speed printer 328 generates the pictograph sheet, booklet or brochure (per 138 of FIG. 4) when called for. A CD-ROM write drive 330 generates the digital equivalent of a pictograph (per 38 of FIG. 1) or a city booklet (per 138 of FIG. 4) as required. And an internet server 332 provides the various outputs in digital form (per 140 of FIG. 1).

Figure 8:
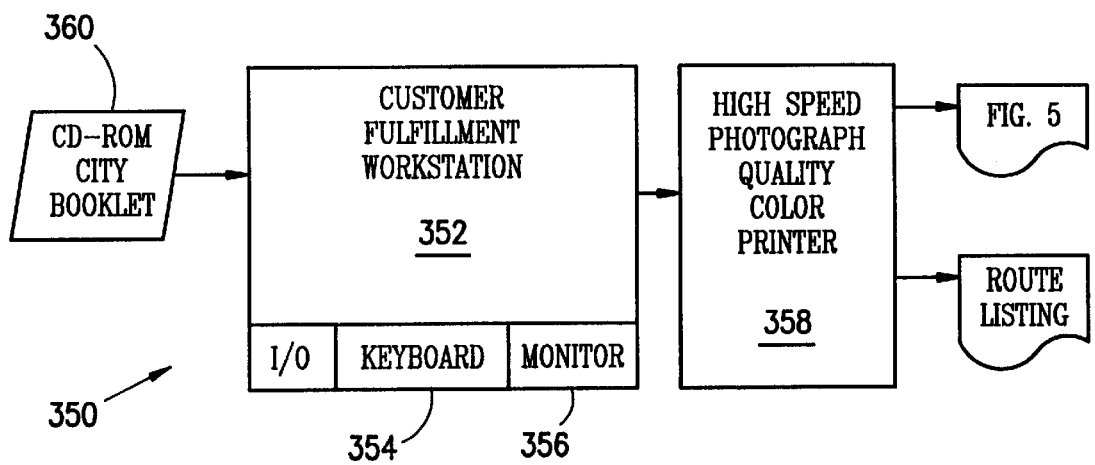
FIG. 8 is a simplified block diagram showing the apparatus by which the regional method of FIGS. 4–6 may be implemented.

FIG. 8 shows illustrative apparatus, in simplified block diagram form, via which the regional embodiment described in FIG. 6 may be used. A regional use system 350 is based on the capabilities of a high end PC 252 serving as the core of a customer fulfillment workstation. The fulfilment workstation 352 includes the usual I/O devices such as a keyboard 354, a high resolution color monitor 356 and a high speed, photographic quality color printer 358. Upon loading a CD-ROM 360 containing a regional city booklet, such as item 138 of FIG. 3, and entering starting points, destinations, and output class and style as requested by a customer or end user, the fulfillment workstation 352 produces the desired outputs. The operating system resident in the workstation 352 functions as previously described in connection with output block 100 of FIG. 4, with the exception that workstation 352 does not need to replicate the internet or network outputting capability. Thus, the customer fulfillment workstation 352 accepts a CD-ROM and regenerates a hard copy of it's city booklet content and/or generates a route listing (per 276 of FIG. 6) for guiding an end user from the inputted starting point(s) to the inputted destination(s).

Although the invention has been described in terms of preferred point-to point and regional embodiments, the invention should not be deemed limited thereto since other embodiments and modifications will readily occur to one skilled in the art. It is therefore to be understood that the appended claims are intended to cover all such modifications as fall within the true spirit and scope of the invention.

What is claimed is:

1. A method of guiding a traveler between a predetermined starting point and a predetermined destination using a plurality of photographic images, comprising the steps of:

(a) determining a route between said starting point and said destination and selecting a set of way points along said route, said way points chosen to assist a traveler in following said route;

(b) capturing a visual image of each way point in photographic form and arranging the resulting set of all photographs into driving order so as to be simultaneously viewable thereby forming a static pictograph; and (c) providing said pictograph in hard copy form for use in guiding said traveler.

2. The method of claim 1 comprising the further step of providing said static pictograph in digital form for transmission to and reconstitution into said hard copy static pictograph to guide said traveler.

3. The method of claim 2 wherein said digital form is a CD-ROM for delivery to and reconstitution into said static hard copy static pictograph to guide said traveler.

4. The method of claim 1 wherein said step of determining a route includes determining at least one preferred route and one or more alternate routes, whereby a distinct static pictograph is provided for at least one of said preferred and alternate routes.

5. A method of providing an end user with information for guiding travel between any one of a plurality of starting points within a region having boundaries and any one of a plurality of destinations within said region using photographic images, comprising the steps of:

(a) selecting a set of way points within said region, said way points defining routes to be followed between any one of said starting points and any one of said destinations;

(b) capturing a visual image of each way point in photographic form and arranging the resulting set of all photographs into an addressable array of photographs that are simultaneously viewable; and (c) providing said addressable array of photographs in static hard copy form for use in guiding said travel.

6. The method of claim 5 comprising the further steps of:

(a) specifying one of said plurality of starting points and one of said plurality of destinations;

(b) determining a route between said one specified starting point and said one specified destination based on said selected way points, and producing a listing of way point addresses derived from said addressable array of all photographs; and (c) providing said listing of way point addresses for use in combination with said addressable array of photographs for guiding said travel.

7. The method of claim 6 wherein the step of determining a route includes determining at least one preferred route and one or more alternate routes, whereby a distinct addressable array of photographs and a corresponding listing of way point addresses is provided for said preferred route and for each of said one or more alternate routes.

8. The method of claim 7 comprising the further step of providing said listing in digital form for transmission via a network for reconstitution into static hard copy form and for use in guiding said travel.

9. The method of claim 5 comprising the further step of providing said addressable array of all photographs alternately in digital form for transmission to and reconstitution by said end user into said addressable array static hard copy.

10. The method of claim 9 wherein said digital form is a CD-ROM for delivery to and reconstitution by said end user into said static hard copy.

11. A system for guiding a traveler between a predetermined starting point and a predetermined destination using a plurality of photographic images, comprising:

(a) means for determining a route between said starting point and said destination and for selecting a set of way points along said route, said way points chosen to assist a traveler in following said route;

(b) means for capturing a visual image of each way point in photographic form and arranging the resulting set of all photographs into driving order so as to be viewable altogether in a single document thereby forming a static pictograph; and (c) means for providing said pictograph in hard copy form for use in guiding said traveler.

12. The system of claim 11 further comprising means for providing said pictograph in digital form for transmission to and reconstitution into said static hard copy pictograph to guide said travel.

13. The system of claim 11 wherein said means for capturing a visual image is an input device chosen from the group of photographic cameras, video cameras, and digital cameras.

14. A system for providing an end user with information for guiding travel between any one of a plurality of starting points within a region having boundaries and any one of a plurality of destinations within said region using photographic images, comprising:

(a) means for selecting a set of way points within said region, said way points defining routes to be followed between any one of said starting points and any one of said destinations;

(b) means for capturing a visual image of each way point in photographic form and arranging the resulting set of all photographs into an addressable array of photographs that are viewable altogether in a single document; and (c) means for providing said addressable array of all photographs in static hard copy form for use in guiding said travel.

15. The system of claim 14 further comprising:

(a) means for specifying one of said plurality of starting points and one of said plurality of destinations;

(b) means for determining a route between said one specified starting and said one specified destination point based on said selected way points, and for producing a listing of way point addresses derived from said addressable array of photographs; and (c) means for providing said listing of way point addresses for use in combination with said addressable array of all photographs for guiding said travel.

16. The system of claim 14 wherein said means for capturing a visual image is an input device chosen from the group of photographic cameras, video cameras, and digital cameras.

* * * * *